United States Patent Office 2,996,450
Patented Aug. 15, 1961

2,996,450
WATER-IN-OIL EMULSION DRILLING FLUID
John D. Zech and James Hurst, Wilmington, Del., assignors to Atlas Powder Company, Wilmington, Del., a corporation of Delaware
No Drawing. Filed Apr. 23, 1957, Ser. No. 654,441
16 Claims. (Cl. 252—8.5)

This invention relates to an improved water-in-oil emulsion drilling fluid for use in earth boring. More particularly, it relates to a water-in-oil emulsion drilling fluid which employs an emulsifier from a class of amide type, oil-soluble, surface-active agents.

No other single factor has been as important in the drilling industry's continuing effort to improve drilling rates and practices as the growth of a body of knowledge concerning drilling mud compositions and properties. Recently, water-in-oil emulsion drilling fluids containing over 30 volume percent water have been developed. In such fluids, oil is the continuous phase which forms a film around finely divided water droplets.

The water-in-oil fluids which have been developed to date have not usually found application as general-purpose drilling fluids, but rather have been utilized for specific and specialized applications. They have usually been used as completion fluids in water-sensitive producing formations, as work-over fluids, as gun perforating fluids, and for drilling salt and anhydrite sections.

Usual current water-in-oil emulsion muds are limited in their application because (a) at 200° F. and higher, not unusual bottom hole circulating temperatures, the emulsions are unstable and there is gel formation, (b) the emulsions are unable to withstand contamination by large amounts of water or alkali and, (c) the change-over from a water-base fluid to the water-in-oil fluid, in the course of the specialized use of the latter, often involves a complete conversion (i.e. the disposal of all the water-base fluid and the mixing of an entirely fresh batch of drilling mud).

An object of this invention is, therefore, the development of a general purpose water-in-oil emulsion drilling fluid.

An additional object of this invention is the development of a stable water-in-oil emulsion drilling fluid that can be used where mud temperatures are as high as 200° to 350° F.

An object of this invention is also to create a water-in-oil drilling fluid which is unaffected by large amounts of salt water contamination.

Another object of this invention is to produce an emulsion drilling fluid the stability of which is unaffected by alkali contamination or by contamination with large amounts of other materials likely to be encountered under use conditions.

A further object of this invention is to prepare a drilling fluid which possesses desirable fluid loss, viscosity and gel strength characteristics. The fluid is also non-flammable and, compared to oil-base muds, unobjectionable to handle.

Still another object of the instant invention is to provide a drilling fluid which is capable of utilizing a water-base fluid for the water phase of the water-in-oil emulsion, thus facilitating a smooth change-over from a water-base fluid to a water-in-oil emulsion drilling fluid.

The above objects of this invention as well as additional objects will be apparent to those skilled in the art from a consideration of the following description and claims.

The drilling muds of this invention in large measure owe their novel and unusual properties to the use of an emulsifier belonging to a new class of amide type, oil-soluble, surface-active agents. Depending upon initial water phase content and the amount and type of solid additives present, drilling fluids of the invention usually can be contaminated with large percentages, up to 50%, of either salt water, red bed mud or 5% caustic soda solution, and still remain in stable emulsion form. Viscosity, gel strength and fluid-loss properties can be restored to desired values by adjustment of oil content, emulsifier content and, on occasion, solids content.

The extreme stability of the emulsion drilling fluid over a wide temperature range and in the presence of many contaminants indicates the outstandingly superior emulsifying ability of the class of emulsifiers employed.

The emulsifiers are derived from polyhydric alcohols having at least three hydroxy radicals per molecule. A first step in the synthesis of the emulsifiers is the condensation of a polyhydric alcohol with epichlorohydrin, or a compound similar to epichlorohydrin which also contains two reactive functional groups.

The reaction may be performed in the presence of an acidic catalyst as is well known in the prior art. Preferred catalysts are those of the Lewis acid type which include, for example, $BF_3$, $BF_3$ etherate, $AlCl_3$, $SnCl_4$, but $H_2SO_4$, p-toluene sulfonic acid and the like may also be used.

The reaction may be carried out at any temperature from about 75° to 175° C., the preferred range being from 90 to 130° C. A temperature of 90° usually insures a reasonable reaction speed. Above about 130°, decomposition and dehydration of hexitols often tends to occur.

While the reaction is generally carried out in the absence of solvent or diluent, such materials may be used if desired to lower the viscosity, as an aid in controlling temperature, or to permit the use of lower temperatures where high melting polyhydric alcohols (such as hexitols) are used.

Suitable polyhydric alcohols or mixtures thereof for use in this connection include, among others, triols (such as glycerol), tetritols (such as erythritol), pentitols (such as xylitol, arabitol, etc.), the hexitols (such as sorbitol, mannitol, dulcitol, etc.), polyhydric alcohols containing more than six hydroxy groups and polyhydric alcohols such as for example pentaerythritol, trimethylolethane, and trimethylolpropane which are polymethylol alkanes.

Suitable polyhydric alcohols also include anhydro derivatives of other polyhydric alcohols (having at least three hydroxy groups per molecule) in which water has been removed from two hydroxyl groups to form a cyclic ether, such as 1,4 sorbitan, and also external ethers of polyhydric alcohols, as, for example diglycerol.

Another group of suitable polyhydroxy alcohols comprises the monosaccharides such as sorbose, mannose, glucose, arabinose and xylose.

The polyhydric alcohols useful in this invention include those, of the type listed above, which have been modified by etherification with alkylene oxides such as ethylene oxide, 1,2 propylene oxide and mixtures thereof. As is well known in the art, such a reaction yields products containing polyoxyalkylene chains of varying length. If a mixture of alkylene oxides is employed, a given polyoxyalkylene chain may contain both the oxyethylene group and the oxypropylene groups. For the purpose of utilization in this invention the most suitable polyoxyalkylene ethers of polyhydric alcohols are those formed by reacting from one to six mols of alkylene oxide with each mol of polyhydric alcohol. The term polyhydric alcohol when used hereafter is intended to include all of the above exemplified compounds and mixtures thereof.

In lieu of epichlorohydrin other reactive epihalohydrins may be used such as epibromohydrin and epiiodohydrin. Other compounds such as 1-chloro-2,3 epoxybutane and 2-chloro-3,4 epoxybutane are also suitable for the condensation. At least one mol of such compounds must be combined with each mol of polyol but up to one mol may be combined for each hydroxyl equivalent of the polyol. For hexitols, from one to three moles of epichlorohydrin are generally preferred.

The condensation products are for the most part very viscous syrups. They are complex mixtures which may contain residual free polyhydric alcohol in addition to various isomeric epichlorohydrin-polyhydric alcohol condensates (also referred to as chlorhydroxypropyl ethers).

The condensation product is in turn reacted with a basic nitrogen compound which contains at least two hydrogen atoms, each of which is bonded to basic nitrogen. These basic nitrogen compounds include ammonia, ethylene and propylene polyamines containing from two to three amino nitrogen atoms and at least two amino hydrogen atoms, and reactive primary mono-amines. Primary mono-amines which have the amino group attached to a tertiary carbon atom will not react with the condensation products of the first step to produce products which are suitable for the subsequent reaction because of steric hindrance effects. The term "reactive primary mono-amine" when used henceforth is intended to exclude such primary mono-amines.

Preferred reaction temperatures range from 20 to about 120° C., with an optimum range from about 30° C. to about 100° C. This reaction is exothermic and it may be carried out in an inert solvent, such as water or a lower alcohol. It is also possible to use an excess of the primary amine as a solvent where the primary amine being used is a liquid. In a case of ammonia or a volatile primary amine, such as methyl or ethyl amine, it is desirable to carry out the reaction under pressure so as to avoid the loss of the volatile reactant and thereby maintain it in excess of the theoretical molecular requirements.

By carrying out the reaction under super atmospheric pressure, higher temperatures can be used and the reaction time correspondingly reduced.

Sutiable primary mono-amines for use in this connection are exemplified by methyl amine, ethyl amine, n-propyl-amine, isopropyl amine, n-butyl amine, sec. butyl amine, isobutyl amine, n-amyl amine, n-hexyl amine, cyclo-hexyl amine, ethanol amine, propanol amine, and 1-amino-2,3 dihydroxy propane (glycerol amine) or mixtures thereof.

Mixtures of primary amines, such as hexadecyl, octadecyl, octadecenyl, and octadecadienyl may also be used. Such products are sold by Armour and Company under the generic trade name "Armeen." These products are more fully described on page 62 of the 1953 edition of "Handbook of Material Trade Names" by Zimmerman and Levine.

It is desirable, in many cases, to use the lower primary amines, which are sufficiently low-boiling, so that they can be readily separated by distillation from the reaction products which are non-volatile.

Suitable amines also include polyamines which contain not more than 3 amino nitrogen atoms. Such amines are exemplified by the ethylene polyamines and the propylene polyamines and include ethylene diamine, diethylene triamine, propylene diamine, dipropylene triamine, triethylene triamine (N-aminoethyl piperazine), hydroxyethyl diethylene triamine (and other reaction products of lower alkylene oxides such as ethylene oxide, propylene oxide or mixtures thereof with polyamines, provided however, that the resulting oxyalkylated amine contains at least two amino hydrogens), 3,3' iminobis propylamine and mixtures of the above.

In this second reaction step an excess of the basic nitrogen compound is used in order to suppress excessive polycondensation. The product of this reaction, which is in the form of an ether hydrohalide, is neutralized with an alkali to liberate a polyhydric primary or secondary amino ether. The salt which is formed may be separated or left with the product as desired.

Representative polyhydric amino ethers are those derived from ammonia or a reactive primary mono-amine and they may be represented by the following formula:

(1) 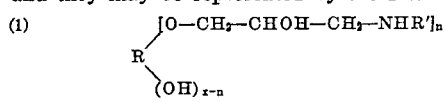

in which R is an hydroxyl free residue of a polyhydric alcohol; $x$ is a number of at least 3; $n$ is a number from one to $x$; and each R' is independently selected from the group consisting of hydrogen, alkyl, hydroxy lower alkyl, cyclo alkyl and polyhydroxy lower alkyl.

Corresponding amino ethers derived from polyethylene and polypropylene polyamines which have from two to three amino nitrogen atoms and at least two amino hydrogen atoms may be represented by the following formula:

(2) 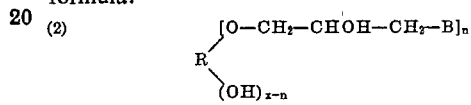

in which R is an hydroxyl free residue of a polyhydric alcohol; $x$ is a number of at least 3, $n$ is a number from 1 to $x$, and each B is independently selected from the group of monovalent radicals consisting of:

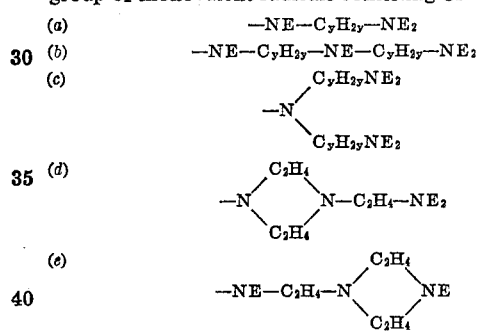

wherein further $y$ is an integer from 2 to 3, and each E is independently selected from the group consisting of hydrogen and hydroxy lower alkyl, provided however that at least one E is hydrogen.

Formation of the emulsifier is completed by amidation of the polyhydroxy amino ether with an aliphatic monocarboxylic acid. Despite the selection of reaction conditions which favor the formation of amides, some esterification results. Since the amino ether may contain free hydroxyl groups in the portion of the molecule derived from alcohol, and in the epichlorohydrin residue, and since further, it may contain additional free hydroxy groups if the primary amine used in the second step was an alkanol amine (such as, for instance, ethanol amine or propanol amine), there is always ester formation. Thus, the final reaction product is often a combined amide and ester. The relative extent of amidation and esterification may be varied by varying the amount of fatty acid reacted with the polyhydroxy amino ether.

Amidation of the polyhydroxy amino ethers may be either total or partial. If only one amino nitrogen atom capable of amidation is present in the ether molecule, such as would be the case when the ether is formed by the seriatim reaction of one molecule of polyol, one molecule of epichlorohydrin and one molecule of a reactive primary monoamine, then the surface-active compositions of this invention are total amidation products. However, when more than one molecule of epichlorohydrin attaches to a given polyol molecule and/or when a polyamine is used to form the amino ether then a molecule of the ether may contain a plurality of amino nitrogen atoms which are capable of amidation. In the case of such poly-amino ethers it is essential that at least one amino nitrogen be amidated. How many more will be amidated is a function of the carboxyl:amino nitrogen ratio of reactants. Generally, low ratios result in partial amidation, higher ratios—on the order of 1:1 tend to result in total amidation, and still higher ratios tend to result in amidation and favor esterification though, as has been pointed out, some esterification always occurs. Generally any ratio of carboxyl:total nitrogen from 0.75 to 6 may be used. Those compounds prepared using ratios of from 3 to 6 having higher ester content. However, the range from 0.75 to 2.0 is generally preferred.

Total amidation of an ether derived from a primary mono-amine can be illustrated by the following equation:

(3)
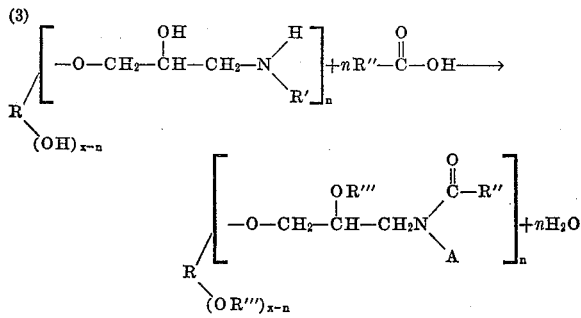

wherein:

$x$ is a number of at least 3 and $n$ is a number from 1 to $x$.

is the acyl radical of an aliphatic mono-carboxylic acid.

R is an hydroxyl-free residue of a polyhydric alcohol.

R' is hydrogen, alkyl, cyclo alkyl, hydroxy alkyl or polyhydroxy alkyl.

Each R''' is independently selected from the group consisting of hydrogen atoms and acyl radicals of aliphatic mono-carboxylic acid.

Each A is independently selected from the group consisting of hydrogen, alkyl, cyclo alkyl, hydroxy alkyl, polyhydroxy alkyl, acylated hydroxy alkyl, and acylated polyhydroxy alkyl.

In the case of the polyamines which have previously been described, the corresponding amidation products may be represented as having the formula:

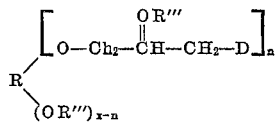

wherein common symbols have the same meaning as in Equation 3 above and wherein each D is independently selected from the group of monovalent radicals consisting of:

(a)                  $-NF-C_yH_{2y}-NF_2$ (b)                $-NF-C_yH_{2y}-NF-C_yH_{2y}-NF_2$ (c)
$$-N\begin{matrix} \diagup C_yH_{2y}NF_2 \\ \diagdown C_yH_{2y}NF_2 \end{matrix}$$

(d)
$$-N\begin{matrix} \diagup C_2H_4 \diagdown \\ \diagdown C_2H_4 \diagup \end{matrix}N-C_2H_4-NF_2$$

(e)
$$-NF-C_2H_4-N\begin{matrix} \diagup C_2H_4 \diagdown \\ \diagdown C_2H_4 \diagup \end{matrix}NF$$

wherein, further, $y$ is an integer from 2 to 3, and each F is independently selected from the group consisting of hydrogen, acyl radicals of aliphatic monocarboxylic acids, hydroxy lower alkyl and acylated hydroxy lower alkyl, provided however that at least one F is the acyl radical of an aliphatic monocarboxylic acid.

The amidation reaction, in which at least one mol of $H_2O$ is evolved per mol of acid reacted, is carried out at an elevated temperature, within the range of about 170 and about 220° C.

If none, or only part of the salt, was removed prior to this reaction, it can be filtered off from the amide emulsifier either with or without dilution with a non-solvent for the salt. For some applications, the salt may be allowed to remain in the final product.

As has been stated, it is also possible to only partially amidate an amino ether which has been made from a polyol-epihalohydrin derivative wherein the ratio of epihalohydrin to polyol was greater than 1:1. Thus, the amide emulsifier products formed by reacting a monocarboxylic acid with the ether made from a polyol-epihalohydrin derivative and ammonia or a reactive primary mono-amine may be generally represented by the following formula:

(4)
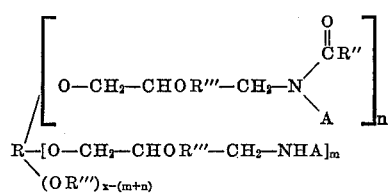

wherein $x$ is a number of at least 3; $n$ is a number from 1 to $x$; and $m$ is a number from zero to the quantity $x-n$; and wherein further,

is the acyl radical of an aliphatic monocarboxylic acid;

R is an hydroxy-free residue of a polyhydric alcohol;

Each A is independently selected from the group consisting of hydrogen, alkyl, cyclo alkyl, hydroxy lower alkyl, polyhydroxy lower alkyl, acylated hydroxy lower alkyl and acylated polyhydroxy lower alkyl; and Each R''' is independently selected from the group consisting of hydrogen atoms and acyl radicals of aliphatic monocarboxylic acids.

The corresponding generalized formula for amide type emulsifier products formed from polyamine derivatives is as follows:

(4-A)
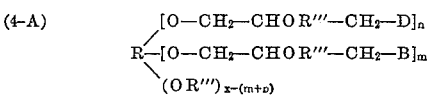

wherein B has the meaning assigned in Formula 2, D has the meaning assigned in Formula 3–a and $x$, $m$, $n$, R, and R''' have the same meaning as in Formula 4.

In the case where total amidation does not occur and consequently only part of the amino groups are reacted, the resulting amides will contain free amino groups and can, therefore, be used as cationic surfactants, whereas the fully amidated products are non-ionic surfactants.

Suitable mono-carboxylic acids for the amidation include the higher fatty acids such as lauric, myristic, palmitic, stearic, oleic, linoleic, linolenic, ricinoleic, 12-hydroxy stearic acid, erucic, as well as mixed acids such as the fatty acids derived from animal and vegetable fats and oils, tall oil, naphthenic acids and acids obtained by the oxidation of petroleum fractions. While fatty acids having 12 to 18 carbon atoms are preferred for this reaction, it is also possible to use a short chain acid such as acetic acid, provided that the amino ether which is being amidated has a long alkyl chain which was derived from a fatty amine in the previous synthesis step.

As is well known in the art, emulsifiers have both a hydrophobe and a hydrophile function. In the present compounds, the hydrophobe function can be contributed by either the carbon chains derived from the amine or those derived from fatty acid, or both. Thus, when a short chain acid as, for example, acetic is employed, a long chain amine should be used. In general, it is preferred that the combined carbon chain lengths of amine and fatty acid groups used in the preparation of the emulsions of this invention total over 12.

The following are examples of the production of emulsifiers:

Example 1

A composition which is especially suitable for the purposes of this invention and which is predominantly the oleic amide of 3 methyl amino-2-hydroxy propoxy sorbitol is made as follows:

613 grams of anhydrous sorbitol are heated to a reaction temperature between 97 and 107° C. and 1.5 cc. of a $BF_3$ etherate catalyst are added.

Thereafter 389 grams of epichlorohydrin (molal ratio polyol to epichlorohydrin 1:1.25) are added dropwise over a period of 34 minutes with vigorous stirring and control of cooling so as to maintain the temperature within the specified range. The temperature is maintained for an additional hour between 97° and 107° C. by the addition of heat to insure completion of the reaction.

308 grams of the condensation product of sorbitol and epichlorohydrin are combined with 1,160 cc. of a 40% solution of methyl amine of room temperature and the mixture is allowed to stand overnight. The temperature gradually rises for several hours to about 35° to 40° C. and then gradually decreases. After standing overnight, the reaction mixture is heated on a steam bath for several hours to insure completion of the reaction. Since methyl amine is a relatively volatile amine, some of the excess will boil off during this heating period.

The reaction mixture is then treated with an amount of aqueous NaOH equivalent to the chlorine content of the epichlorohydrin condensate used. The excess amine and solvent are stripped off, using vacuum at the end of the stripping operation. The product is then taken up in sufficient methanol to obtain a suitable filtering viscosity and the crystalline NaCl is filtered off. Thereafter, the methanol is stripped off leaving the polyhydroxy amino ether as a residue which still contained some sodium chloride.

The reaction yields 325 grams of polyhydric amino ether which contains 4.86% nitrogen by weight. To 286 grams of this product are added 310 grams of oleic acid. The reactants are mixed at a temperature of between 70° and 100° C. Thereafter, they are heated to the reaction temperature of 165° to 200° C. and held there for a period of three hours and 20 minutes.

Initial viscosity is high due to the formation of amine soaps. However, as the temperature is raised and the amidation proceeds, the viscosity decreases.

The resultant amide type emulsifier has an acid number of 10.5, a saponification number of 51 and an OH number of 40.

Example 2

Another oil-soluble emulsifier, especially suitable for the purposes of this invention, which is predominantly the oleic amide of 1.25 (3 amino-2-hydroxy propoxy) sorbitol, is prepared as follows:

2,080 parts of a 70% aqueous solution of sorbitol (8 mols) are concentrated by heating to 120 degrees C. at a pressure of 60 to 100 mm. Hg absolute. The vacuum is then reduced to 40 mm. and the charge held at 120 degrees C. for 30 minutes. The residue contains 0.2 to 0.6% water.

The essentially anhydrous sorbitol (1,459 parts) is cooled to 110 degrees C. and three parts of boron trifluoride ether complex are added. Then, 925 parts of epichlorohydrin (10 mols) are added gradually while cooling as necessary to maintain a temperature of 110 degrees C. After all the epichlorohydrin has been added, the temperature is maintained at 100–110 degrees C. for one hour to complete the reaction. The yield of concentrated sorbitol-epichlorohydrin condensate is 2,387 parts.

The product is a light-colored, very thick syrup at room temperature. For this reason, 259 parts of water are added to dilute the product to a total of 2646 parts of 90% sorbitol-epichlorohydrin condensate.

The total sorbitol-epichlorohydrin condensate, while still warm, is added over a one hour period of 2,430 parts (300% excess) of ammonium hydroxide, (28% $NH_3$, 40 mols). The reaction is slightly exothermic and should be controlled so that the reaction temperature is about 65 degrees C. during the addition. After the addition of all the sorbitol-epichlorohydrin condensate, the charge is heated to 120 degrees C. and held at that temperature for 1.5 hours. The product is then heated to remove excess ammonia and water.

In the next step, as has been discussed above, the polyhydroxy amino ether is liberated from the hydrochloride by the use of sodium hydroxide. Where there has been no loss of the material, the amount of sodium hydroxide used should be based on the equivalents of epichlorohydrin used. In addition, some excess sodium hydroxide may be used at this point if it is desired that the final product contain fatty acid soap and also to facilitate removal of ammonia from the hydrochloride.

In this particular preparation, 840 parts (10.5 mols) of 50% sodium hydroxide are slowly added to the ether hydrochloride. The quantity of hydroxide used includes 5% excess to insure removal of the ammonia from the hydrochloride. During the addition, the temperature is maintained in range of 115 to 120 degrees C. Thereafter, water and ammonia are distilled off by heating to 180 degrees C. at atmospheric pressure. The charge is held at 180 degrees C. as long as appreciable water distillation occurs. The weight of product is approximately 2,780 parts.

To this product, still at 180 degrees C., are added 2,175 parts (7.5 mols) of oleic acid over a period of from five to fifteen minutes while slow heating is continued. By the end of an hour the temperature should have been gradually raised to about 200 degrees C. where it is held for about two hours longer. The reaction mixture is then cooled to at least 115 degrees C.

The product from 10-pound mols of epichlorohydrin will have a total weight of 4,800 pounds which includes 585 pounds of sodium chloride and 156 pounds of sodium oleate. It may be used directly as an emulsifier, mixed with bentonite, or processed in several other ways. If more soap is desired in the final product, excess sodium hydroxide and fatty acid can be used in the previous synthesis steps, or alternatively soap from an outside source may be added directly.

More details and examples concerning the preparation of the foregoing compounds will be found in the copending application of John Zech, Serial No. 654,442, filed April 23, 1957.

Preferred examples of this class of oil-soluble emulsifying agents include the oleic amides of mono and poly (3 methyl amino-2-hydroxy propoxy) sorbitol, the oleic amides of mono and poly (3 n-butyl amino-2-hydroxy propoxy) sorbitol, the tallow fatty acid amides of mono and poly (3 n-butyl amino-2-hydroxy propoxy) sorbitol, the oleic amides of mono and poly (3 methyl amino-2-hydroxy propoxy) erythritol, the oleic amides of mono and poly (3 glyceryl amino-2-hydroxy propoxy) sorbitol, the oleic amides of mono and poly (3 ethanol amino-2-hydroxy propoxy) sorbitol, the tall oil amides of mono and poly (3 ethanol amino-2-hydroxy propoxy sorbitol, the oleic amide of mono and poly (3 amino-2-hydroxy propoxy) sorbitol, the lauric amides of mono and poly (3 cyclohexyl amino-2-hydroxy propoxy) sorbitol, the oleic amides of mono and poly (3 ethylene diamino-2-hydroxy propoxy) sorbitol and the oleic amides of mono and poly (3 diethylene triamino-2-hydroxy propoxy) sorbitol, the oleic amides of mono and poly (3 ethanol amino- 2-hydroxy propoxy) glycerol, and the oleic amides of mono and poly (3 methyl amino-2-hydroxy propoxy) diglycerol. Some of the hydroxy groups of these amides may be esterified.

Typical drilling fluids employing the amide as the emulsifier also include a water phase (preferably containing salt) and an oil phase. It is often desirable to include additional components which are conventional in the art. Concentration and utility of some of these in the particular water-in-oil emulsions of this invention will be discussed.

The drilling fluid should contain from about 40 to about 75 volume percent of water phase. These limits are a function of the viscosity and density characteristics required for the particular drilling application and represent a preferred though not a critical range. Sea water or oil-field brines can be advantageously used since they are generally more readily available than fresh water. Their salt content also contributes to emulsion stability. In general, any water-soluble salt of the alkali metals and alkaline earth metals may be used. The salt content of the water phase may range from 2% by weight to complete saturation; however the range above about 5% is usually preferred.

An oil phase is employed in an amount necessary to make up the difference between the percent of water phase and 100%. Any type of animal, vegetable, or mineral oil may be used, but it has been found that a refined hydrocarbon oil such as No. 2 fuel oil, diesel fuel oil or kerosene is preferable. These oils are of known composition and it is, therefore, easier to control the external phase of the emulsion.

Some solid additives serve to increase the density of the fluid when necessary. These solids such as, barium sulfate, iron oxide and strontium sulfate are usually termed weighting agents. The amount of weighting agent added is a function of the desired mud density.

Other solid additives such as, for example, ground limestone, work-over clay, bentonite and kaolin clays are usually employed as a fluid-loss control agent since they give the drilling fluid plastering properties. These materials are usually finely ground (e.g. about 200 standard mesh) and are often added to the extent of about 20 pounds per barrel.

It may sometimes be advantageous to use a non-ionic water-soluble emulsifier in addition to the amide type emulsifier. In the following table, wherein the numbers in parentheses represent mols of ethylene oxide, some of the many non-ionic water-soluble emulsifiers which can be used are listed:

| Trademark | Chemical Description |
| --- | --- |
| Renex 20 | Polyoxyethylene mixed esters of fatty and resin acids. |
| Tween 80 | Polyoxyethylene (20) sorbitan mono-oleate. |
| Myrj 52 | Polyoxyethylene (40) stearate. |
| Renex 30 | Polyoxyethylene (12) tridecyl alcohol. |
| Triton X-100 | Polyoxyethylene nonyl phenol. |
| "Staybelite" | Polyoxyethylene hydrogenated rosin. |

The water-soluble emulsifier is usually preferably added in concentrations ranging from 0.1 to 5 pounds per barrel of drilling fluid.

It has also been found that the presence of a fatty acid soap in the formulation is advantageous, particularly when the drilling fluids are to be weighted with materials such as barium sulfate.

While these soaps can be added to the formulation as a separate item, there are other ways to include them. For instance, in the case where the emulsifier is the oleic amide of a polyhydroxy amino ether, all or part of the sodium oleate desired can be formed in situ if an excess of NaOH is used in effecting the liberation of the ether from the ether hydrochloride. When the subsequent amidation is performed, the same fatty acid used to form the amide also forms the soap. Generally, from about 2 to about 15% excess alkali is used for this purpose in the ether liberation step.

Regardless of its source or point of addition to the formulation, the soap of an aliphatic mono-carboxylic acid, when used, is preferably added within the range of about 15 to 35 parts (by weight) per 100 parts (by weight) of the active amide type emulsifier. About 20 parts per 100 parts of amide is generally an optimum quantity of soap.

About 3 to 11 pounds of the amide type emulsifier are usually used in each barrel of drilling mud with about 5 pounds per barrel being a preferred quantity for a non-weighted mud.

Some suggested formulations for drilling muds which are representative of the invention follow. All quantities are given in parts by weight. The figures preceding the parentheses represent the ratio of epichlorohydrin to polyhydric alcohol used in the preparation of the condensate from which the emulsifiers are derived. However, where no number is present, the ratio is 1:1 and when the ratio is 2:1, the prefix di- is used. All quantities are given in parts by weight.

*Example 3*

| | |
| --- | --- |
| Saturated salt water | 252 |
| No. 2 fuel oil | 117 |
| Oleic amide of 5 (3 cyclohexyl amino-2-hydroxy propoxy) sorbitol | 5 |

*Example 4*

| | |
| --- | --- |
| Saturated salt water | 252 |
| No. 2 fuel oil | 117 |
| 200 mesh bentonite clay | 20 |
| Renex 30 | 3 |
| Amide product of Example 1 | 5 |

*Example 5*

| | |
| --- | --- |
| Saturated salt water | 280 |
| No. 2 fuel oil | 120 |
| 200 mesh bentonite clay | 20 |
| Tallow fatty amide of 1.25 (3 n-butyl amino-2-hydroxy propoxy) sorbitol; product of Example III-6, Zech case, supra | 3 |

*Example 6*

| | |
| --- | --- |
| Saturated salt water | 280 |
| No. 2 fuel oil | 120 |
| 200 mesh bentonite clay | 20 |
| Oleic amide of 3 methyl amino-2-hydroxy propoxy erythritol; product of Example III-7, Zech case, supra | 5 |

*Example 7*

| | |
| --- | --- |
| Salt water (10%) | 252 |
| No. 2 fuel oil | 117 |
| Oleic amide of 3 methyl amino-2-hydroxy propoxy mannitol | 5 |

*Example 8*

| | |
| --- | --- |
| Saturated salt water | 252 |
| No. 2 fuel oil | 117 |
| 200 mesh bentonite clay | 20 |
| Renex 30 | 3 |
| Oleic amide of di (3 ethanol amino-2-hydroxy propoxy) sorbitol; product of Example III-14, Zech case, supra | 4 |

*Example 9*

| | |
| --- | --- |
| Saturated salt water | 280 |
| No. 2 fuel oil | 120 |
| 200 mesh bentonite clay | 20 |
| Tall oil amide of di (3 ethanol amino-2-hydroxy propoxy) sorbitol; product of Example III-15, Zech case, supra | 10 |

Example 10

| | |
|---|---|
| Saturated salt water | 280 |
| No. 2 fuel oil | 120 |
| 200 mesh bentonite clay | 20 |
| Lauric amide of 1.75 (3 n-butyl amino-2-hydroxy propoxy) sorbitol | 5 |

Example 11

| | |
|---|---|
| Saturated salt water | 252 |
| No. 2 fuel oil | 117 |
| Lauric amide of 3 cyclohexyl amino-2-hydroxy propoxy sorbitol; product of Example III-21, Zech case, supra | 5 |

Example 12

| | |
|---|---|
| Saturated salt water | 252 |
| No. 2 fuel oil | 117 |
| 200 mesh bentonite clay | 20 |
| Triton X-100 | 3 |
| Stearic amide of 1.75 (3 n-butyl amino-2-hydroxy propoxy) sorbitol; product of Example III-22, Zech case, supra | 5 |

Example 13

| | |
|---|---|
| Saturated salt water | 100 |
| No. 2 fuel oil | 117 |
| 200 mesh bentonite clay | 20 |
| Renex 20 | 3 |
| Barium sulfate | 400 |
| Sodium oleate | 1 |
| Amide product of Example 2 | 10 |

Example 14

| | |
|---|---|
| Saturated salt water | 252 |
| No. 2 fuel oil | 117 |
| Tween 80 | 2 |
| Barium sulfate | 350 |
| Sodium stearate | 3 |
| Stearic amide of di 3 methyl amino-2-hydroxy propoxy xylitol | 10 |

Example 15

| | |
|---|---|
| Saturated salt water | 100 |
| No. 2 fuel oil | 117 |
| 200 mesh bentonite | 20 |
| Sodium oleate | 3 |
| Amide product of Example 2 | 10 |
| Barium sulfate | 400 |

Formulations of this general type exhibit high emulsion stability at temperatures from 200 and 350° G. In static oil separation tests at these temperatures only a small percentage of oil separates. Low fluid-loss, low gel strength, and workable viscosities are also characteristics of these formulations.

Depending upon the initial concentration of water-phase, and the amount and type of additives present, emulsion drilling fluids formulated using such amide type emulsifiers can often be contaminated with up to 50% of either salt water, red bed mud, or 5% caustic soda solutions. The extreme stability of the emulsion drilling fluids over a wide range of temperatures and in the presence of many contaminants indicates the outstandingly superior emulsifying ability of the amide type emulsifiers.

It has been discovered that if the products of this invention are mixed with the solid fluid-loss control material, a mixed composition can be obtained in the form of a dry free-flowing powder containing at least 25% active amide. Such dry, free-flowing powders are of great convenience in accurately formulating muds in the field, in making handling economies possible, and in allowing for easy formation of oil solutions of emulsifier. A dry powder which flows freely at room temperature can be made by using at least about 60% by weight of bentonite.

It is also possible to add the alkali soap, such as sodium oleate, during the blending. If this is done, less bentonite or the like need be used to obtain a free-flowing product. A typical formulation of pre-packaged additives containing added soap has a weight distribution as follows:

| | Percent |
|---|---|
| Bentonite | 62 |
| Amide product of Example 2 | 27 |
| NaCl | 3.9 |
| Na oleate—formed in situ | 1.1 |
| Na oleate—added | 6.0 |
| | 100 |

An alternative procedure is to ship the amide as a solution. A 60% solution of the amide dissolved in an aromatic solvent derived from petroleum has been found to be excellent for this purpose and has substantially the same advantages as the powdered blend. When this material is used, the hydrocarbons solvent becomes part of the oil phase of the final drilling fluid.

Of considerable practical importance in the utilization of water-in-oil emulsion drilling fluids of this invention, as well as any fluids wherein the emulsifier is a surface active agent of the amide type which is unaffected by alkali, is the fact that a water-base mud, such as is often used during the initial stages of a drilling operation, may be used as the water phase of the water-in-oil emulsion drilling fluid. These water-base muds often have a high pH to prevent starch fermentation and/or repress calcium ion solubilization. Since the instant emulsifiers, as has been stated above, are unaffected by the presence of alkali, the high pH of some water base fluids does not prevent them from being used as the water phase of the water-in-oil emulsion.

The conversion from water-base mud to water-in-oil emulsion is preferably best made by adding the water base mud to an oil solution of the amide type emulsifier, creating an emulsion, and thereafter adding any additional oil as well as other ingredients which may be required for the final water-in-oil formulation.

In the field a suggested procedure would involve the addition of oil and emulsifier to an empty mud pit. Such solutions are more easily formed if either the dry, free-flowing powder type or aromatic solution type of emulsifier blend is used initially. The required amount of water-base mud is then pumped from the hole to the pit and the entire contents of the pit circulated through the mud pumps and jetted until an emulsion is formed. Depending upon the relative volumetric capacities of the hole and mud pit one or more such operations may be necessary to complete the conversion. On the other hand, with the utilization of proportioning pumps and in-the-line mixing equipment, the changeover can be accomplished as a continuous process.

The muds of this invention can be used in any conventional manner for drilling wells. For example, the mud may be mixed in mud pits and pumped into the drill hole through the hollow drill stem of the rotary drilling equipment. The mud leaving through eyes or ports in the drill bit which is attached to the drill stem contacts the walls of the well hole, thus performing a plastering function while simultaneously removing cuttings and performing other functions. The mud may be returned to the pits via the annulus between the borehole and the drill stem. When the cuttings have been separated and any lost mud replaced, the mud is recycled to the well.

The particular method of circulating the mud varies, of course, with the type of drilling tools being used. However, the fluid of this invention is useful for all types of drilling which require a circulating mud including such specialized forms of drilling as, for example, coring.

The same properties and characteristics which make the emulsion fluid valuable for drilling also make it valuable as an adjunct in various other well-servicing operations including, for example, perforating, fracturing and fishing. In all of these applications the fluid may serve to protect the formation from water, act as a hydrostatic sealing medium and help prevent collapse of the casing. Under conditions where there is no circulation and temperatures are high it still maintains its emulsion characteristics and properties. Accordingly, when the term "drilling fluid" is used herein it is intended to include fluids which are used for all of the above purposes. Similarly, the term "well-servicing" is intended to include drilling and the other well servicing operations described above.

It will be understood that while specific examples of chemical reactions and mud formulations have been presented, the invention is not to be limited by these examples.

What is claimed is:

1. A stable water-in-oil emulsion drilling fluid comprising an oil phase, a water phase and, as the oil-soluble, surface-active emulsifier, a composition of matter formed by the steps of condensing a polyhydric alcohol containing from three to six hydroxyl groups per molecule with a reactive epihalohydrin, reacting the product of the aforesaid reaction with a basic nitrogen-containing compound selected from the group consisting of ammonia, reactive primary alkyl monoamine, reactive primary hydroxy lower alkyl monoamine, reactive primary cyclo alkyl monoamine, reactive primary polyhydroxy lower alkyl monoamine, and alkylene polyamines containing from 2 to 3 amino nitrogen atoms and at least 2 amino hydrogen atoms per molecule, liberating the ether condensation products with an alkali and thereafter acylating the resulting mixture to form a fatty amide.

2. The drilling fluid of claim 1 which further contains at least 15 parts by weight of alkali metal soap per 100 parts by weight of the surface-active emulsifier.

3. A stable water-in-oil emulsion drilling fluid comprising an oil phase, a water phase and, as the oil-soluble, surface-active emulsifier, a composition of matter formed by the steps of condensing a polyhydric alcohol containing from three to six hydroxyl groups per molecule with a reactive epihalohydrin, reacting the product of the aforesaid reaction with a reactive primary alkyl monoamine, liberating the ether condensation products with an alkali and thereafter acylating the resulting mixture to form a fatty amine.

4. A stable water-in-oil emulsion drilling fluid comprising an oil phase, a water phase and, as the oil-soluble, surface-active emulsifier, a composition of matter formed by the steps of condensing a polyhydric alcohol containing from three to six hydroxyl groups per molecule with a reactive epihalohydrin, reacting the product of the aforesaid reaction with a lower alkylene polyamine containing from 2 to 3 amino nitrogen atoms and at least two amino hydrogen atoms, liberating the ether condensation products with an alkali and thereafter acylating the resulting mixture to form a fatty amine.

5. A stable water-in-oil emulsion drilling fluid comprising an oil phase, a water phase and, as the oil-soluble, surface-active emulsifier the composition of matter formed by the steps of (a) condensing sorbitol with a reactive epihalohydrin (b) reacting the product of the aforesaid reaction with methyl amine (c) liberating the ether condensation product of the previous step with an alkali and (d) amidating the liberated ether with an aliphatic monocarboxylic acid containing at least 12 carbon atoms per molecule.

6. The emulsion drilling fluid of claim 5 wherein the said aliphatic monocarboxylic acid is oleic acid.

7. The drilling fluid of claim 6 which further includes an alkali metal soap.

8. A stable water-in-oil emulsion drilling fluid comprising an oil phase, a water phase and, as the oil-soluble, surface-active emulsifier the composition of matter formed by the steps of (a) condensing sorbitol with a reactive epihalohydrin (b) reacting the product of the aforesaid reaction with ammonia (c) liberating the ether condensation product of the previous step with an alkali and (d) amidating the liberated ether with an aliphatic monocarboxylic acid containing at least 12 carbon atoms per molecule.

9. The emulsion drilling fluid of claim 8 wherein the said aliphatic monocarboxylic acid is oleic acid.

10. The drilling fluid of claim 9 which further includes an alkali metal soap.

11. A stable water-in-oil emulsion drilling fluid comprising an oil phase, a water phase and, as the oil-soluble, surface-active emulsifier, a composition of matter formed by the steps of condensing a polyhydric alcohol containing from three to six hydroxyl groups per molecule with a reactive epihalohydrin, reacting the product of the aforesaid reaction with ammonia, liberating the ether condensation products with an alkali, and thereafter acylating the resulting mixture to form a fatty amide.

12. A dry, free-flowing solid additive for use in preparing water-in-oil emulsion drilling fluids which comprises sufficient bentonite to make said additive a dry free-flowing powder, and at least 25 weight percent of an oil-soluble, surface-active emulsifier formed by the steps of condensing a polyhydric alcohol containing from three to six hydroxyl groups per molecule with a reactive epihalohydrin, reacting the product of the aforesaid reaction with a basic nitrogen compound selected from the group consisting of ammonia, reactive primary alkyl monoamine, reactive primary hydroxy lower alkyl monoamine, reactive primary cyclo alkyl monoamine, reactive primary polyhydroxy lower alkyl monoamine, and alkylene polyamines containing from 2 to 3 amino nitrogen atoms and at least 2 amino hydrogen atoms per molecule, liberating the ether condensation products with an alkali and thereafter acylating the resulting mixture to form a fatty amide.

13. A dry, free-flowing solid additive for use in preparing water-in-oil emulsion drilling fluids which comprises sufficient bentonite to make said additive a dry free-flowing powder and at least 25 weight percent of an oil-soluble, surface-active emulsifier formed by the steps of condensing a polyhydric alcohol containing from three to six hydroxyl groups per molecule with a reactive epihalohydrin, reacting the product of the aforesaid reaction with a reactive primary aliphatic monoamines, liberating the ether condensation products with an alkali and thereafter acylating the resulting mixture to form a fatty amide.

14. A dry, free-flowing solid additive for use in preparing water-in-oil emulsion drilling fluids which comprises sufficient bentonite to make said additive a dry free-flowing powder and at least 25 weight percent of an oil-soluble, surface-active emulsifier formed by the steps of condensing a polyhydric alcohol containing from three to six hydroxyl groups per molecule with a reactive epihalohydrin, reacting the product of the aforesaid reaction with a lower alkylene polyamine containing from 2 to 3 amino nitrogen atoms and at least two amino hydrogen atoms, liberating the ether condensation products with an alkali and thereafter acylating the resulting mixture to form a fatty amide.

15. A dry, free-flowing solid additive for use in preparing water-in-oil emulsion drilling fluids which comprises sufficient bentonite to make said additive a dry, free-flowing powder, and at least 25 weight percent of an oil-soluble, surface-active emulsifier formed by the steps of condensing a polyhydric alcohol containing from three to six hydroxyl groups per molecule with a reactive epihalohydrin, reacting the product of the aforesaid reaction with ammonia, liberating the ether condensation products with an alkali, and thereafter acylating the resulting mixture to form a fatty amide.

16. A method of converting a water-base drilling fluid to a water-in-oil emulsion drilling fluid, during the course of a rotary earth drilling operation, wherein the said

15 water-base fluid becomes the water phase of the said emulsion drilling fluid which comprises the process of making an oil solution of an amide type emulsifier which has been made by the seriatim steps of: condensing a polyhydric alcohol containing from three to six hydroxyl groups per molecule with a reactive epihalohydrin, reacting the product of the aforesaid reaction with a basic nitrogen compound selected from the group consisting of ammonia, reactive primary alkyl monoamine, reactive primary hydroxy lower alkyl monoamine, reactive primary cyclo alkyl monoamine, reactive primary polyhydroxy lower alkyl monoamine, and alkylene polyamines containing from 2 to 3 amino nitrogen atoms and at least 2 amino hydrogen atoms per molecule, liberating the

16 ether condensation products with an alkali, and acylating the resulting mixture to form a fatty amide continuing said process by combining said solution with said water-base fluid and emulsifying said solution with said fluid.

References Cited in the file of this patent

UNITED STATES PATENTS

| | | |
|---|---|---|
| 2,509,588 | Dawson | May 30, 1950 |
| 2,581,464 | Zech | Jan. 8, 1952 |
| 2,609,370 | Gaver et al. | Sept. 2, 1952 |
| 2,661,334 | Lummus | Dec. 1, 1953 |
| 2,689,219 | Menaul | Sept. 14, 1954 |
| 2,702,787 | Freeland | Feb. 22, 1955 |

---

UNITED STATES PATENT OFFICE

CERTIFICATE OF CORRECTION

Patent No. 2,996,450             August 15, 1961

John D. Zech et al.

It is hereby certified that error appears in the above numbered patent requiring correction and that the said Letters Patent should read as corrected below.

Column 6, line 35, for "hydroxy" read -- hydroxyl --; column 11, line 50, for "G" read -- F --; column 13, lines 45 and 56, for "amine", each occurrence, read -- amide --.

Signed and sealed this 10th day of July 1962.

(SEAL)
Attest:

ERNEST W. SWIDER
Attesting Officer

DAVID L. LADD
Commissioner of Patents

UNITED STATES PATENT OFFICE
CERTIFICATE OF CORRECTION

Patent No. 2,996,450                          August 15, 1961

John D. Zech et al.

It is hereby certified that error appears in the above numbered patent requiring correction and that the said Letters Patent should read as corrected below.

Column 6, line 35, for "hydroxy" read -- hydroxyl --; column 11, line 50, for "G" read -- F --; column 13, lines 4 and 56, for "amine", each occurrence, read -- amide --.

Signed and sealed this 10th day of July 1962.

(SEAL)
Attest:

ERNEST W. SWIDER
Attesting Officer

DAVID L. LADD
Commissioner of Patents